United States Patent [19]

Shea

[11] 4,440,234
[45] Apr. 3, 1984

[54] SPRINKLER

[75] Inventor: Edward T. Shea, Huntington, N.Y.

[73] Assignee: The Reliable Automatic Sprinkler Company, Inc., Mt. Vernon, N.Y.

[21] Appl. No.: 722,766

[22] Filed: Sep. 13, 1976

Related U.S. Application Data

[63] Continuation of Ser. No. 585,966, Jun. 11, 1975, abandoned.

[51] Int. Cl.³ .............................................. A62C 37/08
[52] U.S. Cl. ....................................................... 169/39
[58] Field of Search ................................... 169/19–21, 169/37–42, 57

[56] References Cited

U.S. PATENT DOCUMENTS

| | | | |
|---|---|---|---|
| 551,162 | 12/1895 | Hill | 169/40 |
| 1,231,439 | 6/1917 | Simonds et al. | 169/39 X |
| 1,379,195 | 5/1921 | Lewis | 169/42 |
| 1,919,508 | 7/1933 | Griffith | 169/39 X |
| 2,165,477 | 7/1939 | Griffith | 169/39 |
| 2,502,754 | 4/1950 | Rowley | 169/38 |
| 2,664,956 | 1/1954 | Barz | 169/38 |
| 3,469,632 | 9/1969 | Ault | 169/39 |
| 3,625,289 | 12/1971 | Gloeckler | 169/39 |

Primary Examiner—David M. Mitchell
Assistant Examiner—Michael Mar
Attorney, Agent, or Firm—Brumbaugh, Graves, Donohue & Raymond

[57] ABSTRACT

A sprinkler has a frame and a cap closing a fluid discharge orifice at one end of the frame. A lever member is pivoted at one end portion on a compression screw which extends from a frame portion generally opposite the cap. The lever member curves from its one end portion to a portion generally parallel to a strut member which extends from the cap to the pivoted end portion of the lever. A pair of arms extend from one member and straddle the other. One arm has a socket for receiving a ball on one end of a tubular retainer and the other arm has a boss engaging a dimple on the other end of the retainer. A side of the retainer engages the arm-straddled member to hold the members in place until heat as from a fire melts a fusible element in the retainer to permit the ball to retract into the retainer. The retainer then pivots about the boss to release the strut from the cap for discharging fluid from the orifice.

36 Claims, 3 Drawing Figures

SPRINKLER

This is a continuation of application Ser. No. 585,966 filed June 11, 1975 abandoned.

BACKGROUND OF THE INVENTION

Sprinklers for discharging fire-extinguishing fluid in response to heat activation of a heat responsive member associated with each sprinkler have been known for many years. There are many designs for such sprinklers. Many of these designs have an orifice for discharging the fire-extinguishing fluid at one end of a box-like frame and a deflector at an opposite end of the frame for dispersing the fluid discharged from the orifice. A cap is placed over the orifice and a structure extends from the cap across the opening defined by the frame to the deflector end of the frame for normally holding the cap on the orifice to prevent discharge of the fluid. The cap-retaining structure has a heat fusible portion which responds to heat as from a fire to permit the structure to move from its cap-retaining position to release the fluid.

Even though the function and structural requirements of such sprinklers are well-known, the many designs for such sprinklers indicate the difficulty of providing a structure which best meets all the requirements of the sprinkler. The sprinklers must disperse the fluid over a predetermined and substantial area to permit predetermination of a pattern of the minimum number of sprinklers required for discharging fire-extinguishing fluid over the entire area to be protected by a sprinkler system. As safety equipment for the extraordinary conditions of an unexpected fire, the sprinklers must remain closed to prevent unwanted and damaging discharge of fluid for the substantial time during which no fire exists, but be highly reliable for discharging the fire-extinguishing fluid if and when, at some remote time after installation, a fire does occur in the area protected by the sprinkler system. In addition, it is esthetically desirable that the sprinklers be both inconspicuous and, when observed, as attractive as possible.

Long experience with sprinklers and careful observation of their operation has determined that a sprinkler structure having a deflector across an open frame from a fluid discharge orifice is a highly desirable way of properly dispersing fire-extinguishing fluid over a substantial area. However, such operation requires that the position of the structure normally retaining the cap over the fluid discharge orifice after it releases the cap be known for determining its affect on the pattern of the fluid dispersed by the sprinkler. In many sprinkler designs, it is intended to have the retaining structure fall from the sprinkler when it releases the cap so as to avoid interference with the pattern of the discharged fluid. In such designs, it would be a malfunction of the sprinkler to have the cap-retaining structure block a portion of the fluid even if the structure operates sufficiently to permit fluid discharge. The area in which the structure blocked the fluid discharge would then not receive fire-extinguishing fluid and the sprinkler system would fail to protect the entire area for which it was designed.

Reliable operation of sprinklers at an unpredictable and often remote time after installation is also difficult to achieve. The cap retaining structure must be strong enough to prevent discharge of fluid when no fire is present which would unnecessarily damage property in the area protected by the sprinkler system. The cap-retaining strength of the structure also must be sufficient to resist vibration, accidental bumping, cleaning, and other contact which is not intended to initiate the discharge of fluid. In spite of the strength required of the cap-retaining structure, the structure still must timely release the cap when a fire activates the heat responsive member in the structure. Dust and dirt accumulated over the years since the sprinkler was installed must not interfere with its operation. In addition, paint which often is accidentally sprayed onto the sprinkler during painting of the structure such as a ceiling adjacent the sprinkler should have a minimum tendency to prevent operation of the sprinkler.

Modern tastes in design tend to prefer simpler, functionally oriented appearances. Such structures should not have unnecessary projections or gewgaws and additionally should be sufficiently small to make the sprinklers as inconspicuous as possible. Such design functionally contributes to the reliability of operation of the sprinkler by providing a minimum of projections which could hang up on other parts and a minimum of joints and interacting parts which accumulated dust, dirt, or paint could cause to malfunction.

One sprinkler design which attempts to meet all these well-understood but difficult-to-achieve objectives has a box frame extending from a capped fluid discharge orifice to an oppositely disposed fluid deflector. An O-shaped strut extends from the cap to an end portion of a generally S-shaped lever pivoted against a compression screw at the deflector end of the frame. The S-shaped lever extends from the end portion at the screw around one side of the strut, through its central opening, and then parallel to the strut to engage a side of a cylindrical retaining assembly. The retaining assembly has a dome-like projection at one end and a ball extending from the other end which engage opposite sides of the central opening in the O-shaped strut to hold the lever and strut in cap-retaining position. The ball is normally held in the end of the retaining assembly by a disk which is held in place by an eutectic material in the cylinder of the retaining assembly. Heat from a fire then melts the eutectic to permit the disk and ball to slide into the cylinder. In proper operation, the cylinder then pivots about the projection on its other end to pass through the central opening in the O-shaped strut and release the lever and strut from their cap-retaining position, all of the cap-retaining structure then falling from the sprinkler. However, the dome-like projection on the cylinder urges the cylinder laterally across the opening in the strut so that the ball-end of the cylinder may catch on the strut or dust, dirt or paint accumulated about the opening in the strut. If the cylinder is so prevented from passing through the opening, proper operation of the sprinkler may be prevented. In addition, the O-shaped strut configuration requires the cap-retaining structure to have a wider elevation and thus be more conspicuous than a strut without a central opening.

SUMMARY OF THE INVENTION

It is an object of the invention to provide a sprinkler which adequately retains a cap over a fluid discharge orifice when the sprinkler is not in use, reliably releases the cap in response to heat as from a fire, and presents a functional, small elevation for a pleasing but inconspicuous appearance. It is a more particular object of the invention to provide a retainer which is not subject to lateral displacement which potentially interferes with reliable operation of the sprinkler.

The invention provides a sprinkler which has a generally box-like frame extending from a fire-extinguishing fluid discharge orifice to a deflector opposite the orifice for dispersing fluid discharged from the orifice. A lever member has an end portion pivoted at the deflector end of the frame opposite the orifice. A cap is placed over the orifice to normally prevent fluid discharge and a strut extends from the cap to the pivoted end portion of the lever for retaining the cap over the orifice. The lever member curves from the end portion to another end portion extending generally parallel to the strut member. A pair of arms extends from one of the members to straddle the other. A retainer extends between the arms on the opposite side of the other member from the member having the arms for normally holding the lever and strut members in cap-retaining position.

The retainer is a generally tubular member having a ball normally projecting partially from one end and a dimple or other socket structure at its other end. A eutectic material is positioned in the retainer adjacent the dimpled end for holding a disk which holds the ball in its normal position projecting from the end of the retainer. One of the arms has a socket for receiving the ball and the other of the arms has a boss or projection extending into engagement with the dimple or socket structure for cooperatively holding the retainer on the arms between the socket and the boss.

When a fire or other source of heat reaches a temperature predetermined by the melting point of the eutectic material, the eutectic melts to permit the disk and ball to slide within the retainer toward the dimpled end. As the ball slides from the socket, the lever pushes the retainer from between the arms and pivots relative to the frame to release the strut member from its cap-retaining position, the retainer, lever and strut members, and cap then falling from the sprinkler to open the orifice for freely discharging fluid toward the deflector. The uninterrupted flow of fluid against the deflector then produces the predetermined spray pattern for which the sprinkler was designed.

The ball and socket structure of the retainer cooperate to hold the retainer firmly between the arms and thus prevent vibration or accidental bumping from operating the sprinkler. The dimple and boss structure of the retainer and arm also cooperate to permit the retainer to slidingly rotate about a substantially fixed point without lateral displacement toward the other of the arms. The clearance between the ball-end of the retainer and the adjacent arm which had received the ball is thus not reduced by lateral displacement of the retainer as it is urged from between the arms by the lever. By maintaining the lateral position of the retainer between the arms, any reduction of the clearance between the retainer and the arms by accumulated dust, dirt, and paint is not as detrimental to reliable operation of the sprinkler as it would be if the retainer were laterally displaced to further reduce the normal clearance between the retainer and the arms as the retainer moves from between the arms. Reliable operation of the sprinkler is thus improved over known designs in which lateral displacement of a retaining assembly is urged by the same movement which removes the retaining assembly from the sprinkler.

By having a pair of arms which extend from one member and straddle the other, the lever and strut structure normally retaining the cap over the fluid discharge orifice may be designed so that the arms are more inconspicuous than an O-shaped structure having a central opening with the same spacing as that between the arms. In addition, the cross-section of the cap-retaining structure does not have an intertwined, S-shaped appearance which detracts from the functional simplicity of the design.

A still further advantage of the invention over the O-shaped and S-shaped members known in the art is the ability to preassemble the retainer between the arms for later installation in a sprinkler. For such preassembly, the sprinkler additionally has a compression screw extending from the frame adjacent the deflector and terminating in the pivot engaged with the end portion of the lever. With the compression screw retracted, the strut member may be placed between the cap and end portion of the lower member with the retainer preassembled between the arms and the compression screw then tightened into pivoting engagement with the end portion of the lever member. The compression screw may additionally provide the pressure which holds the lever member against the retainer and urges the retainer from between the arms when the eutectic material melts to free the ball from its socket in the one arm.

DESCRIPTION OF THE DRAWINGS

The preferred and an alternative embodiment of the invention will now be described with reference to drawings of the embodiments, it being understood that the embodiments may be installed in orientations other than that illlustrated in the drawings, in which.

DESCRIPTION OF THE PREFERRED AND ALTERNATIVE EMBODIMENTS

Figure 1:
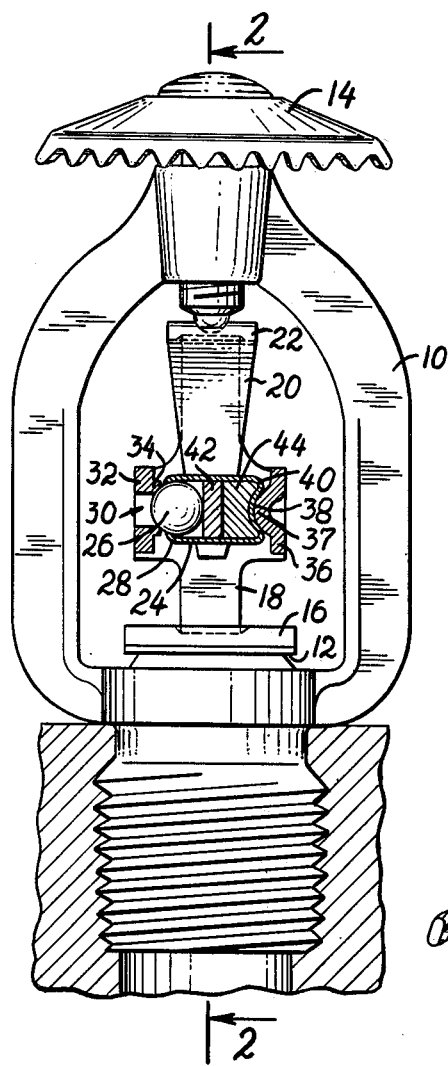
FIG. 1 is a front elevation of the preferred embodiment.

FIG. 1 shows a sprinkler having a generally box-like frame 10 having ribbed arms extending from an orifice 12 at one end of the frame to an oppositely disposed deflector 14 for dispersing fluid discharged from the orifice. A cap 16 is placed over the orifice for normally preventing the discharge of fluid. A structure comprising a strut member 18, a lever member 20, and a retainer 24 normally holds the cap over the orifice. The strut member 18 engages the cap at one end and extends toward the deflector end of the frame. The lever member 20 engages the other end of the strut member at an end portion 22 which is pivoted adjacent the strut on a pivot portion 25 of a compression screw 23 extending from the deflector end of the frame. The retainer 24 extends between arms (32, 36 as later described) of the strut member which straddle an end of the lever member which curves from the pivoted end portion toward the cap to be generally parallel to the strut member. The lever member engages the retainer to normally hold the structure between the compression screw and the cap for holding the cap over the orifice to prevent discharge of fire-extinguishing fluid from the orifice.

The retainer 24 is a generally tubular member of circular or other cross-section. A ball 26 projects from a retaining lip portion 28 at one end of the hollow, tubular retainer 24. The ball is received in a socket at 30 in one of the arms, arm 32, extending from the strut member 18. The socket 30 is shown as a bore extending through the arm 32 with a peripheral projection 34 extending into engagement with the ball. The arc of the ball subtended by the projection 34 then extends into the bore to form a ball and socket coupling between the retainer 24 and arm 32.

The other of the arms extending from the strut member, arm 36, has a boss 37 which extends into engagement with a dimple 38 on a solid end portion of the retainer adjacent the arm 36. Edges 40 of the dimple adjacent sides of the retainer 24 curve away from the arm 36 so as not to interfere with later described sliding rotation of the retainer 24 on the boss 37. The boss 37 and dimple 38 thus cooperate to form a ball and socket joint between the arm 36 and the retainer in which the ball portion, boss 37, extends in the same direction as that in which the ball 26 projects from the other end of the retainer.

As will be apparent from the later description of the operation of the sprinkler, the boss and dimple engagement of the retainer and the arm 36 is merely illustrative of the concept of providing sliding rotation of the retainer relative to the arm without lateral displacement along its normal orientation between the arms 32, 36. The dimple and boss may then have other structures providing the same function. For example, the dimple 38 in the solid end portion of the retainer 24 may be replaced by an opening into the hollow interior space of the tubular retainer.

The retainer 24 also has a disk 42 engaged with an opposite side of the ball 26 from that which projects from the retainer and a eutectic material 44 on the opposite side of the disk from the ball. The disk 42 substantially corresponds in cross section to the interior of the tubular retainer but is not attached thereto to be slidable within the retainer toward the dimple 38. The disk 42 distributes the pressure of the ball 26 against the eutectic 44. The eutectic retains the ball and disk in the illustrated position until heat as from a fire melts the eutectic.

Figure 2:
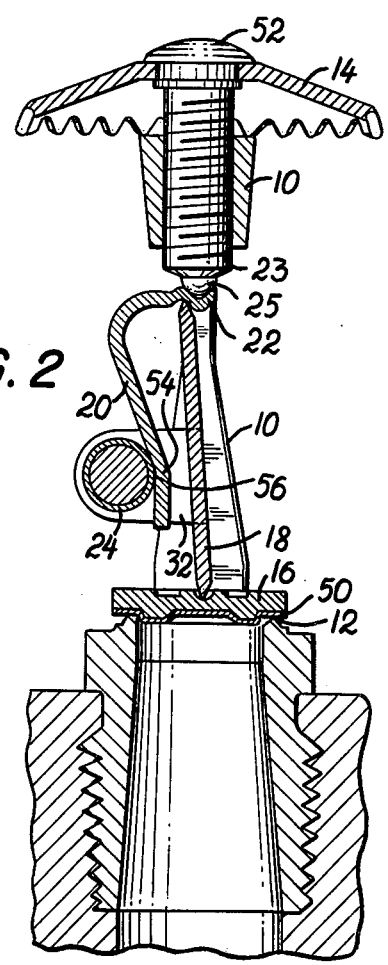
FIG. 2 is a side elevation, partly in section, of the preferred embodiment.

FIG. 2 shows a side elevation, partly in cross section, of the sprinkler shown in FIG. 1. The cap 16 is now seen to have a sealing surface 50 adjacent the orifice 12 for assuring that fluid does not escape from the orifice while the cap is held in place by the strut 18. The compression screw 23 is now seen to extend through the frame 10 and have a head 52 for holding the deflector 14 on the frame. Tightening the compression screw presses the pivot end portion 25 against the end portion 22 of the lever, the engagement of the strut 18 with the end portion of the lever being slightly off-set from the point of engagement of the end portion of the lever with the pivot portion of the compression screw to impart a clockwise moment to the lever member.

The lever member 20 is normally restrained from movement under the moment imparted by the compression screw by engagement of the end portion 54 with a side of the retainer 24. The lever member 20 curves from the end portion 22 toward the retainer to position the end portion 54 generally parallel to the strut member 18 and overlying the strut member between its arms (as described with reference to FIG. 1). Although the illustrated gradual curve of the lever member 20 in which a portion intermediate at its ends overhangs the retainer 24 and the slight reverse curve at 56 for more firmly engaging the retainer are preferred, any curve of the lever member in which the end portion 54 engages and presses against the retainer 24 is contemplated within the invention.

OPERATION OF THE PREFERRED EMBODIMENT

The operation of the preferred embodiment may now be described. When the eutectic 44 reaches a temperature predetermined by the melting point of the selected eutectic material, for example solder, the eutectic melts to release the ball 26 and disk 42 for sliding movement toward the dimple 38. For this purpose, the eutectic is designed to have a smaller volume after melting than before, while solid for retaining the position of the disk shown in FIG. 1. For example, the solid eutectic may be porous structure which collapses into a smaller volume upon melting or it may flow around the edges of the disc to escape from the volume initially occupied by the eutectic.

The movement of the disk, to the right as shown in FIG. 1, permits the ball to slide into the retainer 24 and out of the socket 30, the force for sliding the disk and ball being provided by the moment of the lever member against the retainer. As the ball slides into the retainer, the retainer pivots about the boss 37, outwardly of FIG. 1. The sliding rotation of the dimple 38 about the boss 37 does not laterally displace the retainer 34 between the arms 32, 36, there being a fixed center of rotation for the generally circular cross section of the dimple and boss shown in FIG. 1. Continued movement of the ball into the retainer releases the ball end of the retainer from the socket, the retainer then falling from the sprinkler.

It will be appreciated from FIG. 2 that the clockwise rotation of the lever member 20 as it forces the retainer 24 from the arms (only arm 32 shown in FIG. 2) lifts the end portion 22 of the lever member from the strut member 18, the strut member 18 and lever member 20 then also falling from the sprinkler. As the strut member 18 falls from the sprinkler, it releases the cap 16 which then also falls from the sprinkler to open the orifice 12 for discharge of fire-extinguishing fluid toward the deflector for dispersion onto the fire which produced the heat which released the retainer.

Returning briefly to FIG. 1, it will now be appreciated that the suggested alternative embodiment (not shown) of the retainer 24 in which the dimple 38 is replaced by an opening into the tubular retainer will provide the same operation as that just described with reference to the preferred embodiment shown in FIG. 1. It will also be appreciated that, if the dimple 38 were formed in an end of the eutectic 44 (not shown) instead of a solid end portion of the retainer 24, melting of the eutectic may permit the retainer 24 to move laterally toward the arm 36 by the distance between the edge 40 of the dimple and the portions of the arm 36 adjacent the boss 37. Inasmuch as such lateral movement increases the clearance between the ball-end of the retainer and the arm 32, rather than decreases the clearance as occurs with a dome-like projection extending from the retaining assembly known in the art, such lateral movement is contemplated as being within the term "without lateral movement" as used herein to distinguish the operation of the invention from the operation of the known structure.

DESCRIPTION OF AN ALTERNATIVE EMBODIMENT

Figure 3:
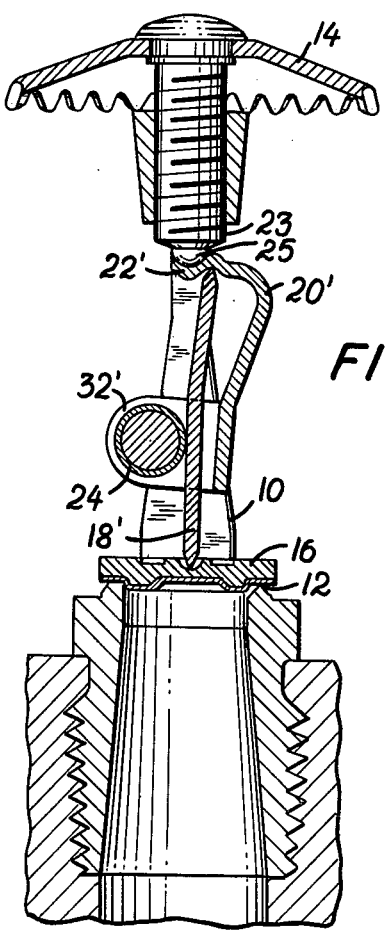
FIG. 3 is a side elevation, partly in section, of an alternative embodiment.

FIG. 3 shows an alternative embodiment of the invention which differs from that described with reference to FIGS. 1 and 2 only in that the arms which extend from one of the strut or lever members to the retainer 24 now extend from the lever member 20' to the retainer and straddle the strut member 18', only one such arm 32' being shown.

The operation of the alternative embodiment is analogous to that just described with reference to the preferred embodiment. The compression screw 23 presses against the end portion 22' of the lever member to provide a moment (illustrated as counter-clockwise in FIG. 3) to the lever member which draws the retainer 24 carried between the arms extending from the lever member (only arm 32' being shown) against the strut member 18'. When a fire or other source of heat raises the eutectic (not shown) in the retainer 24 to the temperature predetermined by the selection of a eutectic having that melting temperature, the retainer 24 is released from engagement between the arms to permit the lever member 20' to rotate counter-clockwise and release the strut 18'. The entire retainer, lever and strut members, and cap structure then fall from the sprinkler for discharging fluid from the orifice 12 toward the deflector 14 for extinguishing the fire.

I claim:

1. In a sprinkler having a frame with first and second ends, an orifice for discharging fluid at the first end of the frame, and a cap over the orifice for normally preventing discharge of fluid from the orifice, compression means at the second end of the frame, a structure positioned between the cap and the second end of the frame for releasably retaining the cap over the orifice, which structure comprises:
a strut member engaging the cap,
a lever member engaging the compression means at the second end of the frame,
the strut and lever members being pivotally engaged and having adjacent portions tending to move away from each other in response to compressive force applied to the structure between the cap and the compression means at the second end of the frame,
a pair of arms affixed to and extending in spaced relation away from the strut member in the direction of and straddling the adjacent portion of the lever member,
a tubular retainer normally held between the pair of arms and engaging the straddled portion of the lever member,
eutectic means within the tubular retainer, and
arm-engaging means projecting from the tubular retainer and normally engaging one of the pair of arms to normally hold the tubular retainer in position to engage the straddled portion of the lever member but responsive to melting of the eutectic means to move inwardly in the tubular retainer, permitting the retainer to be released from the pair of arms and allowing the straddled portion of the lever member to move away from the adjacent portion of the strut member and release of the cap from its position over the orifice.

2. A sprinkler according to claim 1 wherein the lever member pivotally engages the end of the strut member opposite to the cap-engaging end of the strut member.

3. A sprinkler according to claim 1 including deflector means at the second end of the frame.

4. A sprinkler according to claim 1 in which the compression means is a screw.

5. A sprinkler according to claim 1 in which the arm engaging means is a ball.

6. A sprinkler according to claim 5 including a disc within the tubular retainer disposed between the ball and the eutectic means.

7. In a sprinkler having a frame with first and second ends, an orifice for discharging fluid at the first end of the frame, and a cap over the orifice for normally preventing discharge of fluid from the orifice, a structure positioned between the cap and the second end of the frame for releasably retaining the cap over the orifice, which structure comprises:
a first member engaging the cap,
a second member engaging the second end of the frame,
the first and second members being pivotally engaged and having adjacent portions tending to move away from each other in response to compressive force applied to the structure between the cap and the second end of the frame,
a pair of arms extending in spaced relation away from one of the first and second members in the direction of the other of the first and second members and straddling the adjacent portion of the other of the first and second members,
a tubular retainer normally held between the pair of arms and engaging the straddled member, one end of the tubular retainer being supported for pivotal motion on one of the pair of arms,
eutectic means within the tubular retainer, and
a ball projecting from the other end of the tubular retainer and normally engaging the other of the pair of arms to normally hold the tubular retainer in position to engage the straddled member but responsive to melting of the eutectic means to move inwardly in the tubular retainer, permitting the retainer to be released from the pair of arms and allowing the straddled member to move away from the adjacent portion of the other member and release the cap from its position over the orifice.

8. A sprinkler according to claim 7 wherein the second member is a lever pivotally engaging an end of the first member opposite to the cap-engaging end thereof.

9. A sprinkler according to claim 7 wherein the pair of arms extends from the first member and straddles the adjacent portion of the second member.

10. A sprinkler according to claim 7 wherein the second member is a lever pivotally engaging the end of the first member opposite to the cap-engaging end thereof and the pair of arms extends from the second member to straddle the adjacent portion of the first member.

11. A sprinkler according to claim 7 wherein one of the pair of arms has a boss and the tubular retainer has a corresponding dimple to provide support for pivotal motion of the tubular retainer.

12. A sprinkler comprising a body member having a fluid delivery passageway therethrough, oppositely disposed arms on said body member forming a frame outwardly of said fluid passageway and joined at their outer ends, a compression fitting positioned through a secondary passageway in said joined arms on the axial center line of said fluid delivery passageway, a deflector on said compression fitting and a closure on said fluid delivery passageway, an assembly comprising an inverted L-shaped lever having a substantially horizontal portion and a substantially vertical portion and a straight strut, said assembly positioned between and in engagement with said compression fitting and closure and normally retaining said closure on said fluid delivery passageway, said straight strut being positioned substantially on said axial center line, a pair of spaced oppositely disposed sidewardly extending arms on said straight strut and a horizontally disposed fusible material retaining means positioned between said arms and partially engaged in an aperture contained in one of said arms, said substantially vertical portion of said inverted L-shaped lever being normally positioned between said arms and spaced therefrom and between said straight strut and said fusible material retaining means and in engagement with said fusible material retaining means, said fusible material retaining means normally preventing relative motion of said lever with respect to said strut in said assembly and acting to free said lever from said strut upon attainment of a predetermined temperature.

13. The sprinkler set forth in claim 12 and wherein said fusible retaining means comprises a tubular member having an open end, a pellet of fusible material positioned inwardly of said open end, a disc positioned on one side of said pellet and arranged to permit said fusible material of said pellet to flow around the peripheral edges thereof when fused, a sphere positioned partially within said open end of said tubular member and partially within said aperture in one of said arms.

14. The sprinkler set forth in claim 13 and wherein said open end of said tubular member of said fusible retaining means is deformed inwardly sufficiently to cage said sphere partially therein.

15. The sprinkler set forth in claim 12 and wherein said portion of said lever normally positioned between said arms and between said strut and said fusible retaining means is of relatively smaller size than the remainder of said lever so as to reduce the area of contact between said lever and said fusible retaining means.

16. The sprinkler set forth in claim 12 wherein the horizontally disposed fusible retaining means is arranged for minimal contact with said lever and said arms so as to prevent dissipation of heat through said contact.

17. The sprinkler set forth in claim 12 and wherein said sidewardly extending arms on said strut extend outwardly therefrom sufficiently to locate said aperture therein beyond said closure so that heated air moving past said sprinkler directly engages said fusible retaining means.

18. A sprinkler comprising a body member having a fluid delivery passageway therethrough, oppositely disposed arms on said body member forming a frame outwardly of said fluid passageway and joined at their outer ends, a compression fitting positioned through a secondary passageway in said joined arms on the axial center line of said fluid delivery passageway, a closure on said fluid delivery passageway, an assembly comprising a lever having a substantially horizontal portion and a substantially vertical portion and a strut, said assembly positioned between and in engagement with said compression fitting and closure and normally retaining said closure on said fluid delivery passageway, said strut being positioned substantially on said axial center line, a pair of spaced oppositely disposed sidewardly extending arms on said strut one of which has an aperture and a horizontally disposed fusible material retaining means positioned between said strut arms and partially engaged in the aperture, said substantially vertical portion of said lever being normally positioned between said strut arms and spaced therefrom and between said strut and said fusible material retaining means and in engagement with said fusible material retaining means, said fusible material retaining means normally preventing relative motion of said lever with respect to said strut in said assembly and acting to free said lever from said strut upon attainment of a predetermined temperature.

19. The sprinkler set forth in claim 18 and wherein said fusible retaining means comprises a tubular member open at one end, a pellet of fusible material positioned inwardly of said end, a disc positioned on one side of said pellet, a sphere which is positioned partially within said open end of said tubular member and partially within said aperture in said apertured arm.

20. The sprinkler set forth in claim 19 and wherein the open end of said tubular member of said fusible retaining means is deformed inwardly sufficiently to cage said sphere partially therein.

21. The sprinkler set forth in claim 18 and wherein said portion of said lever normally positioned between said arms and between said strut and said fusible retaining means is of relatively smaller size than the remainder of said lever so as to reduce the area of contact between said lever and said fusible retaining means.

22. The sprinkler set forth in claim 18 wherein the horizontally disposed fusible retaining means is arranged for minimal contact with said lever and said arms so as to prevent dissipation of heat through said contact.

23. The sprinkler set forth in claim 18 and wherein said sidewardly extending arms on said strut extend outwardly therefrom sufficiently to locate the aperture therein beyond said closure so that heated air moving past said sprinkler directly engages said fusible retaining means.

24. A fire extinguishing sprinkler head, comprising a frame having a discharge outlet and a deflector spaced relative to the outlet, a compression screw mounted for movement with respect to the frame and located adjacent the deflector and axially aligned with said discharge outlet, a cap normally enclosing said discharge outlet, a releasable lever assembly positioned between the screw and the cap, said lever assembly including a first member having a pair of spaced arms, a hollow member extending in a direction between said arms, a fusible element disposed in said hollow member, a ball located in one end of the hollow member outwardly of said fusible element, socket means formed in one of said arms, said ball being engaged with said socket means, said first member having a first end engaging the cap and having a second end, said lever assembly also including a lever member disposed in engagement with the peripheral surface of said hollow member and being engaged by the second end of the first member, said lever assembly extending between said cap and said compression screw and acting to hold the cap in a closed position, turning down of said compression screw causing a biasing force to be exerted in a direction to effect disengagement of said ball with said socket means, the biasing force being resisted by the frictional engagement of the ball with said socket means to retain the lever assembly in a locked condition, melting of said fusible element acting to reduce the frictional resistance between the ball and said socket means to thereby enable the force of said biasing means to overcome said frictional resistance and release said lever assembly to open said discharge outlet.

25. A fire extinguishing sprinkler head, comprising a frame having a discharge outlet and a deflector spaced relative to the outlet, a compression screw mounted for movement with respect to the frame and located adjacent the deflector and axially aligned with said discharge outlet, a cap normally enclosing said discharge outlet, a releasable lever assembly positioned between the screw and the cap, said assembly including a pair of members, a first of said members having a body and having a pair of spaced generally parallel arms extending outwardly from the body, a tube extending in a direction between said arms, a fusible element disposed in said tube, a movable member having a generally curved outer portion projecting outwardly of an end of said tube and having an inner portion bearing against the fusible element, generally circular socket means in one of said arms and spaced from the peripheral edge of the arm and axially aligned with said tube, the outer portion of said movable member being engaged with said socket means, said lever assembly also including a lever member disposed in engagement with the outer peripheral surface of said tube, one end of the lever member being engaged wih the compression screw and an end portion of said first member being engaged with said cap.

26. The sprinkler head of claim 25, wherein the engagement of the lever member with the compression screw is in axial alignment with the position of engagement of said end portion with said cap.

27. A fire extinguishing sprinkler head, comprising a frame having a discharge outlet and a deflector spaced relative to the outlet, a compression screw mounted for movement with respect to the frame and located adjacent the deflector and axially aligned with said discharge outlet, a cap normally enclosing said discharge outlet, a releasable lever assembly positioned between the screw and the cap, said assembly including a pair of members, a first of said members having a body and having a pair of spaced generally parallel arms extending outwardly from the body, a tube extending in a direction between said arms, a fusible element disposed in said tube, a movable structure having a generally curved outer portion projecting outwardly of an end of said tube and having an inner portion bearing against the fusible element, generally circular socket means in one of said arms and spaced from the peripheral edge of the arm and axially aligned with said tube, the outer portion of said movable structure being engaged with said socket means said lever assembly also including a lever member, disposed in engagement with the outer peripheral surface of said tube, one end of the lever member being engaged with the compression screw and an end portion of said first member being engaged with said cap.

28. The sprinkler head of claim 27, wherein the engagement of the lever member with the compression screw is in axial alignment with the position of engagement of said end portion with said cap.

29. A sprinkler comprising a body member having a fluid delivery passageway therethrough, oppositely disposed arms on said body member forming a frame outwardly of said fluid passageway and joined at their outer ends, a compression fitting positioned through a secondary passageway in said joined arms on the axial center line of said fluid delivery passageway, a deflector on said compression fitting and a closure on said fluid delivery passageway, an assembly comprising an inverted L-shaped lever having a substantially horizontal portion and a substantially vertical portion and a straight strut, said assembly positioned between and in engagement with said compression fitting and closure and normally retaining said closure on said fluid delivery passageway, said straight strut being positioned substantially on said axial center line, a pair of spaced oppositely disposed sidewardly extending arms on said straight strut one of which has an aperture and a horizontally disposed fusible material retaining means positioned between said arms and partially engaged in the aperture, said substantially vertical portion of said inverted L-shaped lever being normally positioned between said arms and spaced therefrom and between said straight strut and said fusible material retaining means and in engagement with said fusible material retaining means, said fusible material retaining means normally preventing relative motion of said lever with respect to said strut in said assembly and acting to free said lever from said strut upon attainment of a predetermined temperature.

30. The sprinkler set forth in claim 29 and wherein said fusible retaining means comprises a tubular member having an open end, a pellet of fusible material positioned inwardly of said end, a disc positioned on one side of said pellet, a sphere which is positioned partially within the open end of said tubular member and partially within said aperture in said apertured arm.

31. The sprinkler set forth in claim 29 and wherein said portion of said lever normally positioned between said sidewardly extending arms and between said strut and said fusible retaining means is of relatively smaller size than the remainder of said lever so as to reduce the area of contact between said lever and said fusible retaining means.

32. The sprinkler set forth in claim 29 and wherein said fusible retaining means comprises a tubular member open at one end, a pellet of fusible material positioned inwardly of said open end, a disc positioned on one side of said pellet, a sphere positioned partially within the open end of said tubular member and partially within the aperture in said sidewardly extending arm.

33. The sprinkler set forth in claim 32 and wherein the open end of said tubular member of said fusible retaining means is deformed inwardly sufficiently to cage the sphere partially therein.

34. The sprinkler set forth in claim 29 and wherein said portion of said lever normally positioned between said sidewardly extending arms and between said strut and said fusible retaining means is of relatively smaller size than the remainder of said lever so as to reduce the area of contact between said lever and said fusible retaining means.

35. The sprinkler set forth in claim 29 wherein the horizontally disposed fusible retaining means is arranged for minimal contact with said lever and said sidewardly extending arms so as to prevent dissipation of heat through said contact.

36. The sprinkler set forth in claim 29 and wherein said sidewardly extending arms on said strut extend outwardly therefrom sufficiently to locate the aperture in said one arm beyond said closure so that heated air moving past said sprinkler directly engages said fusible retaining means.

* * * * *